(12) United States Patent
Torgersen (10) Patent No.: US 11,898,312 B2
(45) Date of Patent: Feb. 13, 2024

(54) DEVICE, SYSTEM AND METHOD FOR LUBRICATING A RAILWAY SWITCH

(71) Applicant: Railway Robotics AS, Ås (NO)

(72) Inventor: Jørgen Torgersen, Ås (NO)

(73) Assignee: Railway Robotics AS, Ås (NO)

( * ) Notice: Subject to any disclaimer, the term of this patent is extended or adjusted under 35 U.S.C. 154(b) by 308 days.

(21) Appl. No.: 17/601,238

(22) PCT Filed: Apr. 3, 2020

(86) PCT No.: PCT/NO2020/050094
§ 371 (c)(1),
(2) Date: Oct. 4, 2021

(87) PCT Pub. No.: WO2020/209726
PCT Pub. Date: Oct. 15, 2020

(65) Prior Publication Data
US 2022/0170212 A1 Jun. 2, 2022

(30) Foreign Application Priority Data
Apr. 9, 2019 (NO) .................................... 20190487

(51) Int. Cl.
*E01B 7/26* (2006.01)
*B61D 15/12* (2006.01)
(Continued)

(52) U.S. Cl.
CPC ................ *E01B 7/26* (2013.01); *B61D 15/12* (2013.01); *B64C 39/024* (2013.01); *B64U 30/20* (2023.01); *B64U 2101/00* (2023.01)

(58) Field of Classification Search
CPC ............ E01B 7/26; B61D 15/12; B64U 30/20
See application file for complete search history.

(56) References Cited

U.S. PATENT DOCUMENTS

| 1,307,498 A | 6/1919 | Johnson |
| 1,644,486 A | 10/1927 | Noel |

(Continued)

FOREIGN PATENT DOCUMENTS

| CN | 204595607 | 8/2015 |
| CN | 109208401 | 1/2019 |

(Continued)

OTHER PUBLICATIONS

Norwegian Search Report for No. 20190487, dated Jul. 24, 2019.
(Continued)

*Primary Examiner* — Richard G Davis
(74) *Attorney, Agent, or Firm* — Andrus Intellectual Property Law, LLP (57) ABSTRACT

A device is for lubricating a railway switch, the device being remotely controllable and configured for moving on a railway track. The device has a container for lubricant and at least one nozzle configured for lubricating the railway switch with the lubricant. A system includes the device and a controller for remotely controlling said device. A method is for lubricating a railway switch, wherein the method includes the steps of remotely directing the device to the railway switch, remotely instructing the device to lubricate the railway switch, and remotely directing the device away from the railway switch to avoid hindering train traffic through the switch.

14 Claims, 6 Drawing Sheets

(51) Int. Cl.
    *B64C 39/02*     (2023.01)
    *B64U 30/20*     (2023.01)
    *B64U 101/00*     (2023.01)

(56) References Cited

U.S. PATENT DOCUMENTS

| | | | |
|---|---|---|---|
| 5,477,941 | A | 12/1995 | Kumar et al. |
| 5,992,568 | A * | 11/1999 | Craig ................ B61K 3/02 |
| | | | 105/72.2 |
| 9,108,479 | B1 * | 8/2015 | Calvert ................ B64C 27/04 |
| 2014/0142868 | A1 * | 5/2014 | Bidaud ............ G01N 21/8803 |
| | | | 702/34 |

FOREIGN PATENT DOCUMENTS

| | | |
|---|---|---|
| DE | 3214149 | 11/1983 |
| DE | 3214149 A1 * | 11/1983 |
| JP | 2001278044 | 10/2001 |
| JP | 2015074407 | 4/2015 |

OTHER PUBLICATIONS

International Search Report and the Written Opinion for PCT/NO2020/050094, dated Jun. 23, 2020.
Response to the Written Opinion for PCT/NO2020/050094, dated Oct. 22, 2020.
The Second Written Opinion for PCT/NO2020/050094, dated Jan. 25, 2021.
Response to the Second Written Opinion for PCT/NO2020/050094, dated Mar. 23, 2021.
The Third Written Opinion for PCT/NO2020/050094, dated Apr. 27, 2021.
The International Report on Patentability for PCT/NO2020/050094, dated Jul. 5, 2021.
Flyvende beredskap, retrieved from: https://www.banenor.no/Nyheter/Nyhetsarkiv/Arkiv/2018/flyvende-beredskap/ on Oct. 1, 2021.
Selvkjørende robotdrone smører sporveksler (Bane NOR) 2018, retrieved from: https://www.banenor.no/Nyheter/Nyhetsarkiv/Arkiv/2018/selvkjorende-robotdrone-smorer-sporveksler/ on Oct. 1, 2021.

* cited by examiner

DEVICE, SYSTEM AND METHOD FOR LUBRICATING A RAILWAY SWITCH

CROSS-REFERENCE TO RELATED APPLICATIONS

This application is the U.S. national stage application of International Application PCT/NO2020/050094, filed Apr. 3, 2020, which international application was published on Oct. 15, 2021, as International Publication WO 2020/209726 in the English language. The International Application claims priority of Norwegian Patent Application No. 20190487, filed Apr. 9, 2019. The international application and Norwegian application are both incorporated herein by reference, in entirety.

FIELD

The invention relates to a device for lubricating a railway switch, the device being remotely controllable and configured for moving on a railway track. The invention further relates to a system comprising the device and a controller for remotely controlling said device. The invention also relates to a method for lubricating a railway switch.

BACKGROUND

Railway switches are among the most important assets in railway operations, as they allow trains to shift tracks and take different routes. However, they are also among the railway assets that cause most train delays, and they require a lot of maintenance. In fact, 20-40% of the total maintenance and inspection costs of railways are related to the switches. Lubrication, geometric measurements, and inspection of railway switches are basic maintenance tasks that prevents train delays. These activities are performed by manual labour, which requires disruption of normal train service due to safety regulations. This reduces freight tonnage capacity, traveller capacity, and heavy maintenance capacity of the railway network, and increases the costs of running the railway network.

Inspection is typically performed using measurement trains and/or imagery trains. However, use of these trains requires disruption of normal train traffic if the capacity of the network is extensively exploited. Measurement trains are typically used 2-4 times a year per railway switch, and they cannot act as first responder to a fault on a railway switch. They are mainly geared towards analysis of the whole network. Also, the cost of operating the measurement trains is high.

To avoid some of the above-mentioned disadvantages, a hovering unmanned aerial vehicle (UAV), commonly known as a drone, can be used for inspection of the railways. However, UAVs have poor energy efficiency and short operation time when performing such inspection on railway switches. Additionally, navigation on the railway network is difficult for a hovering UAV, and the complexity of route planning for a hovering UAV performing inspection of railway switches is high.

The invention has for its object to remedy or to reduce at least one of the drawbacks of the prior art, or at least provide a useful alternative to prior art. The object is achieved through the features which are specified in the description below and in the claims that follow. The invention is defined by the independent patent claims, while the dependent claims define advantageous embodiments of the invention.

In a first aspect the invention relates more particularly to a device for lubricating a railway switch, the device being remotely controllable and configured for moving on a railway track, wherein the device comprises a container for lubricant and at least one nozzle configured for lubricating the railway switch with the lubricant, and wherein the at least one nozzle is further configured for providing a variable lubrication width. The device may for example comprise wheels which fit the railway tracks which typically have a distance of 1435 mm, and one or more motors providing propulsion for the device. Since the device is remotely controllable, it can be unmanned, whereby safety of an operator is not an issue. A device which is configured to be unmanned can also be made relatively small and light, whereby it requires less energy to move. It may also be cheaper to manufacture. The device may for example comprise a frame constructed primarily by a light carbon material. The device may be constructed in a way so that it will not interfere with any nearby equipment, interfere with a current in the railway tracks, or risk creating a short circuit in said tracks. Some or all of the surfaces of the device may for example be coated with an insulating material. Additionally, if the device is light and a train would hit it at high speed, the impact would hardly affect the train and would not harm the passengers. An unmanned and remotely controllable device may also be programmable to automatically operate at specific times and locations which fit with the time schedule of the trains using the railway tracks. No significant disruption of the normal train traffic is therefore required when the device lubricates a railway switch.

In one embodiment, the device may comprise a plurality of nozzles and a control system controlling each nozzle independently from the others, wherein each nozzle is positioned to lubricate a different portion of the railway switch. A railway switch typically comprises a pair of linked tapering rails, known as switch rails, points, or point blades, lying between diverging outer rails known as stock rails. These switch rails can be moved laterally, usually between two end positions, to direct a train coming from the switch rails towards either of two diverging paths. Below the switch rails there are typically a plurality of sliding plates to support said switch rails and ensure that they can slide between the two positions. The switch rails will have a largest lateral displacement at their free ends, wherefrom the displacement will be smaller and smaller towards the opposite ends of the switch rails which are firmly connected to non-movable rails of the railway tracks. Therefore, a broader lubrication width is required at the free end of the switch rails than further towards the fixed end. A variable lubrication width may be obtained by having a plurality of nozzles which are positioned at different distances from the centre of the railway track if the nozzles are controllable independently from each other. In this way more nozzles may be opened at the free end of the switch rails, thus lubricating a broader width, than towards the stock rail end. Thus, the entire movable region of the switch rails may be lubricated in a single drive-through of the device without wasting lubricant by lubricating a wide area also where the displacement width of the switch rails is narrow. As the device needs to carry the lubricant, less use of lubricant means that it is required to be refilled less often, which saves time. As an alternative to the plurality of nozzles, a broad nozzle with a variable opening width may be used, which provides a similar technical effect as the plurality of nozzles. As a further alternative, the at least one nozzle may be movable and be able to distribute lubricant over a width in the transverse direction of the rails, i.e. perpendicularly to the direction of motion of the device on the railways. In this way the device can lubricate the entire width of the railway switch.

In one embodiment, the device may further comprise rotors which allow the device to fly. This will have the advantage that the device may move rapidly to and from railway tracks, whereby no disturbance of the train traffic is required even at very busy railway tracks. The device can simply wait next to the tracks for a train to pass the switch, then fly and land onto the railway tracks to lubricate the switch, and quickly fly off the tracks again. Additionally, the device may easily and rapidly move from one railway track to another, also when the tracks are not connected near the location of the device.

In an alternative embodiment, the device may be configured to be attachable to a separate vessel comprising rotors, for example a commercially available multirotor UAV with no legs. This has the advantage that the separate vessel may quickly be replaced if it stops working, for example due to a damaged rotor or rotor motor.

As it normally requires more energy to fly than to drive, it is an advantage that the device is configured for moving on a railway track even when it can fly. In this way the device can do more work before needing to get a refill on energy. As the device may typically use an electrical motor and a battery to provide energy, the refill on energy will often require a recharge of the battery. Another advantage of being able to move on the railway tracks is that the lubrication will be more precise and less affected by e.g. wind than if the device would be airborne the entire time. Also, navigation to the railway switches becomes trivial after the device has landed on the rails, whereby the complexity of route planning for the device performing maintenance and inspection of railway switches will be low.

The device may typically be stored in automatic drone garages on large railway sites with many switches. Larger railway stations or rail freight terminals are examples of such sites. On smaller sites, the device can be transported in a van and sent out on maintenance and inspection from the van. Optionally, an operator may follow the device take control of the it if something unexpected happens.

The device may comprise a variety of sensors which may make the device able to do inspection and maintenance automatically. For example, the device may be able to fly and operate completely automatically from take-off, while landing on the tracks, during maintenance and inspection of railway switches, and when returning to the take-off point. The device may for example comprise a GPS system, a compass, a stereo camera, a thermographic camera, a lidar system, an AI unit for processing data, and/or a data acquisition and transmission unit.

For example, from the take-off point to the entry point on the tracks, the device may usually follow a flight path which consists of several pre-defined GPS-coordinates. The device may enter the tracks from above, while still in the vertical space between the tracks and a possible overhead line. This vertical gap may for example be around 5 m. The last GPS-coordinate which marks the landing spot may be midpoint between the rails. The device will start the descent towards this GPS-coordinate, while a lidar system may keep the device equidistant to the left and right rail for correct positioning of the device relative to the railway tracks, for example when landing on said tracks. This will assure that the device lands correctly on the tracks and will be especially advantageous in case of GPS interference and/or wind. A stereo camera, which can record images or video in 3D, may ensure correct orientation along the rail, for example in case of GPS and compass interference. An artificial intelligence (AI) engine may be included to process this information and send it to a flight computer. Once the device has landed on the rails, the aerial propulsion motors may be turned off, and the device may start to move forward on the tracks by the rail propulsion motors and wheels towards the railway switch at a suitable speed, for example running speed or higher.

As each railway switch typically has at least one GPS-coordinate in the front, reaching that coordinate means that the device may slow down and start a maintenance and inspection routine. This may typically happen at walking speed or higher. A lidar will typically be the main sensor for detecting the position of the switch and the width of the gap between the switch rail and stock rail. This tells the lubrication system which nozzles should be opened to spray lubrication at the switch. A lidar and stereo camera may detect where the sliding plates of the switch starts and end. This controls when the nozzles should spray. The lidar can simultaneously fetch geometrical gauge data for geometrical gauge measurement, the stereo camera can take pictures for visual inspection, and a thermographic camera can take pictures for thermal inspection. These cameras may for example be programmed to start operating at the GPS-coordinate in front the switch and take pictures throughout the switch. An AI engine can process the data and control the lubrication system. A data acquisition and transmission unit can store the data and send them to a switch analytics platform and/or an asset management system. When the maintenance and inspection is finished, the device may speed up and drive to the next switch for repeating the routine, or it may fly back to the take-off point. The device may for example follow a flight path consisting of several pre-defined GPS-coordinates.

The device may also deliver first-line support to train dispatchers and technicians if a railway switch fails to operate.

One use of the device may be to connect it to a switch analytics platform that the railway operators typically use via Wi-Fi, 4G, or 5G. The switch analytics platform may collect and analyse sensor data coming from the switch and may send work orders directly to the device. The work order may be accompanied with additional information such as GPS coordinate, preferred flight and rail route, preferred timeslot, and type of switch. This may enable automatic maintenance and inspection of railway switches. When the device is out maintaining and inspecting a railway switch, it can send information back to the switch analytics platform in forms of inspection images, thermal images, geometrical gauge data, and type of maintenance that has been performed. The analytics platform may then analyse the results of the maintenance and inspection and either clear the switch as in acceptable condition or send a work order to field personnel to perform heavier maintenance, for example changing a motor or a blade.

Another use of the device may be to connect it to an asset management system and have the asset management system send work orders to the device via the maintenance specialist based on counters or calendars. The device may receive the work orders from the asset management system, which enables semi-automatic maintenance and inspection of switches. When the device is out maintaining and inspecting a railway switch, it may send information back to the asset management system in form of inspection images, thermal images, geometrical gauge data, and type of maintenance that has been performed. Maintenance specialist can analyse the results of the maintenance and inspection and either clear the switch as in acceptable condition or send a work order to field personnel to perform heavier maintenance.

The device may be used for inspection of all types of infrastructure in the railway by using e.g. stereo camera and/or thermographic camera. If the device has rotors, it can also fly above the turbulence zone of trains and any overhead line and inspect the railway without disrupting normal train traffic. Examples of uses of the device may be photographic inspection of the rails, sleepers, water draining culverts, and/or ballast, and/or photographic and thermographic inspection of rail temperature, overhead line system, traction return current system, earthing and bonding system, railway switch heating system, insulated rail joints, persons or animals on or nearby the tracks, and/or faults that may cause train delays or train cancelations.

In one embodiment, the device may further comprise at least one strong and flexible string connecting different portions of the device. This will have the advantage that if the device breaks, for example in a collision with a train, it will be split into fewer pieces, as the strong and flexible string will keep different portions of the device together. There is thereby a smaller risk that a piece of the device will hit and damage e.g. a person, an animal, or a piece of equipment nearby. The string may preferably be situated inside the material in which the device is constructed to assure that said string will not get stuck around external obstacles. The string may for example be situated inside a frame which connects wheels to each other and to a central unit comprising sensors. A possible material for the string is UHMWPE (Ultra High Molecular Weight Polyethylene), also known as HMPE (High Modulus Polyethylene) or HPPE (High Performance Polyethylene). UHMWPE is a polyolefin resin of very high molecular weight, usually between 2 and 6 million g/mol, which has extremely long polymer chains. The long chains serve to transfer load more effectively to the polymer backbone by strengthening the intermolecular interactions. This results in a very tough material with possibly the highest impact strength of any thermoplastic presently available.

In a second aspect, the invention relates to a system comprising the device according to the first aspect of the invention and a controller for remotely controlling said device.

In a third aspect, the invention relates to a method for lubricating a railway switch, wherein the method comprises the steps of: remotely directing the device according to the first aspect of the invention to the railway switch; remotely instructing the device to lubricate the railway switch; and remotely directing the device away from the railway switch to avoid hindering train traffic through said switch.

BRIEF DESCRIPTION OF THE DRAWINGS

In the following is described examples of preferred embodiments illustrated in the accompanying drawings, wherein:

FIG. 1 shows an embodiment of the device according to the invention, viewed from above (FIG. 1A) and from the front (FIG. 1B);

DETAILED DESCRIPTION OF THE EMBODIMENTS

In the drawings, the reference numeral 1 indicates a device according to the invention. The drawing is schematic, and the features therein are not necessarily drawn to scale. Identical reference numerals indicate identical or similar features.

Figure 1A:
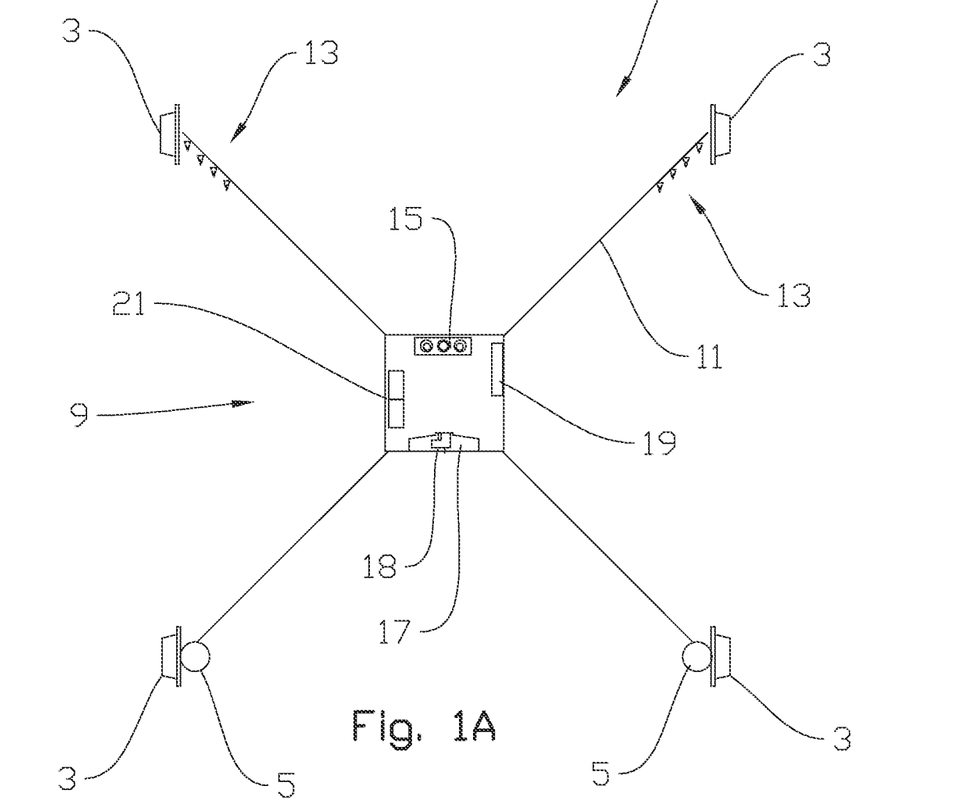
Figure 1B:
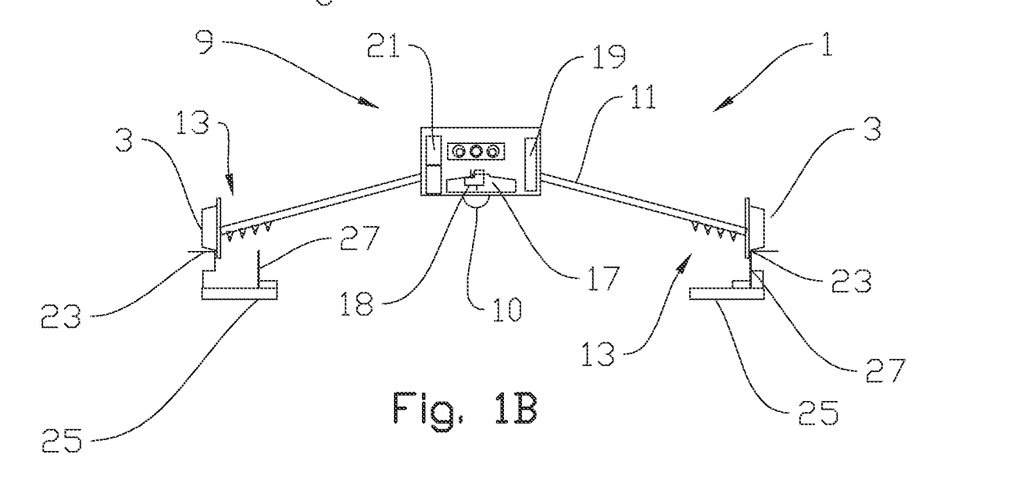

FIGS. 1A and B show a device 1 according to the invention viewed from above and from the front, respectively. The device 1 comprises wheels 3 configured for moving on rails 23 (not shown in FIG. 1A) of a railway track 21 (shown in FIG. 2), and motors 5 for providing propulsion for the device 1. Even though the drawings only show motors 5 for the wheels 3 at the rear portion of the device 1, the device 1 can also comprise motors 5 for the wheels 3 at the front. The wheels 3 are connected via a frame 11, which also carries a central unit 9. The frame 11, and possibly also the central unit 9, may comprise at least one strong and flexible string (not visible in the figures) which is built into the material of said frame 11 possible central unit 9, whereby the device 1 will be broken into fewer pieces in case of a collision with a train. The central unit 9 comprises a camera unit 15 with a stereo and thermographic camera, a lidar 10 for measuring distances, an AI unit 19 for processing collected data, a battery 21, and a container 17 for lubricant. The device 1 comprises a plurality of nozzles 13 for lubricating a railway switch 31 (shown in FIG. 2), the nozzles 13 being positioned at each side of a front portion of the device 1. The container 17 is associated with a pump 18 for pumping the lubricant to the nozzles 13 via a suitable tubing 49 (shown in FIG. 6). The nozzles 13 are individually controlled and are positioned so that they have different distances to the rails 23 when the device 1 is in position of use on said rails 23. In this way the nozzles 13 can lubricate substantially the entire width of the sliding plates 25 whereon the switch rails 27 move.

Figure 2A:
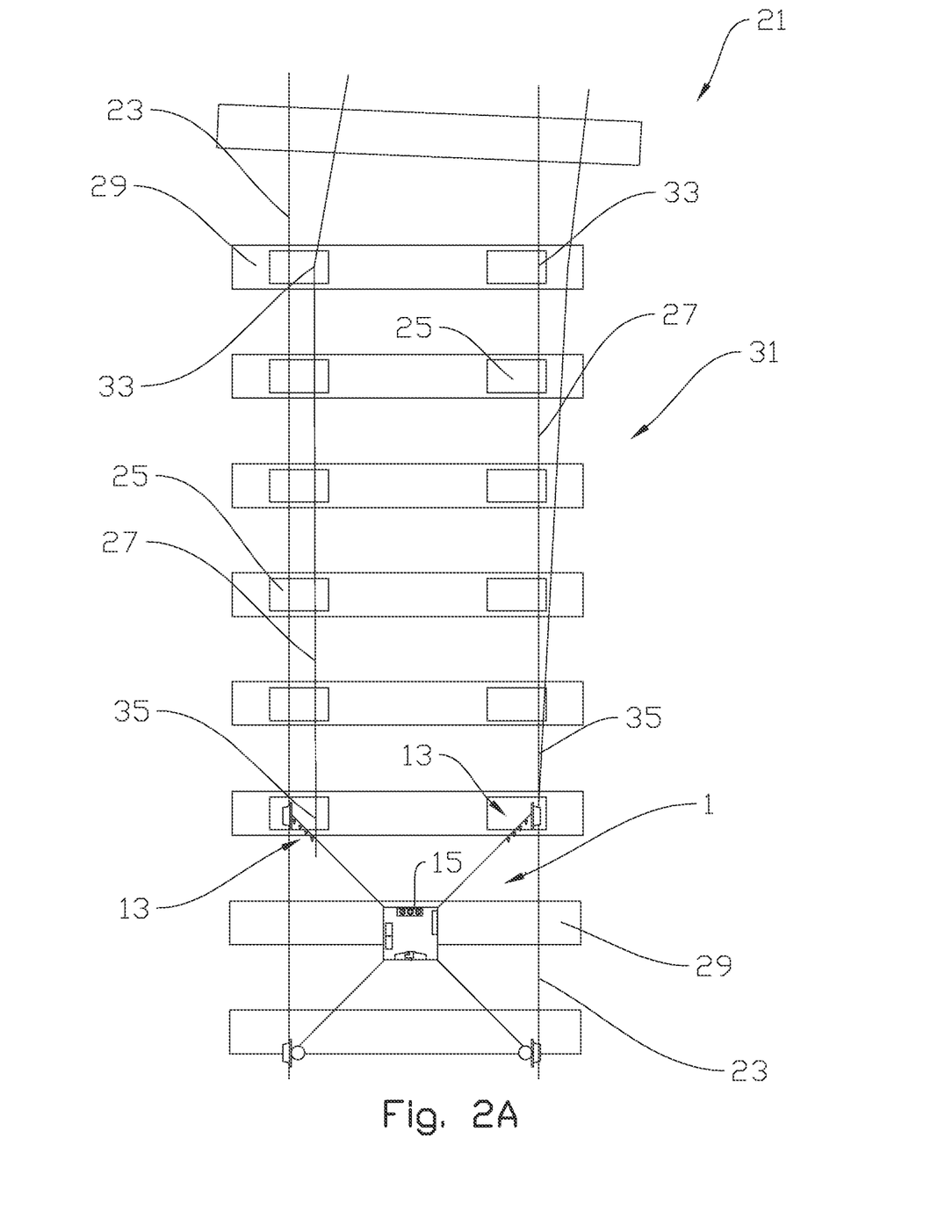
FIG. 2 shows the device from FIG. 1 viewed from above and positioned on a railway track at two different positions along a railway switch.
Figure 2B:
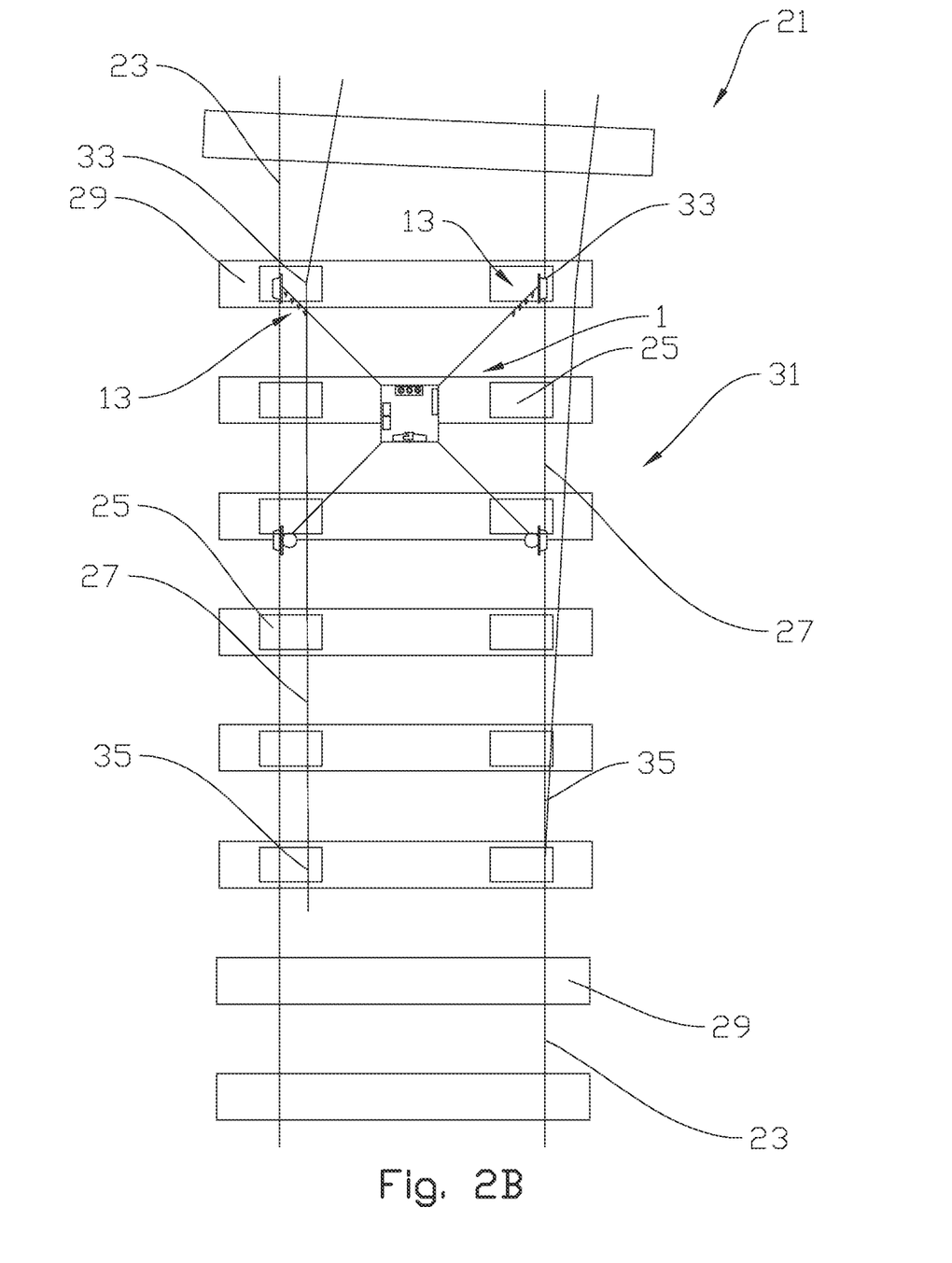

FIGS. 2A and B shows the device 1 from FIG. 1 viewed from above and positioned on a railway track 21 at two different positions along a railway switch 31. The railway track 21 comprises rails 23 supported by railway sleepers 29, and the railway switch 31 comprises switch rails 27 which are movable on sliding plates 25. The switch rails 27 are fixed at one end 33, substantially pivotable around this fixed end 33. The opposite free end 35 therefore has the greatest lateral movement across the sliding plates 25. In FIG. 2A, the device 1 has just entered the railway switch 31 so that the nozzles 13 for lubricating a railway switch 31 are above the first sliding plates 25. The camera unit 15 and/or the lidar system 10 can detect the position of the first sliding plates 25. At this position, the switch rails 27 have the most lateral movement, so all the nozzles 13 are open to lubricate a corresponding wide area of the slide plates 25. As the device 1 moves along the railway switch 31, the range of movement of the switch rails 27 decreases. For example, at the position of the device 1 shown in FIG. 2B, the nozzles 13 are substantially above the fixed end 33 of the switch rails 27. Since the switch rails 27 do not move significantly at this position, only a narrow area of lubrication is required, so only the nozzles 13 directly above the switch rails 27 are open. The camera unit 15 and/or lidar system 10 can detect which nozzles 13 should be open. Alternatively, the nozzles 13 which should be open at any given location of the switch 31 may be predetermined by the geometry of the switch 31. In this way no lubricant is wasted by being sprayed above portions of the railway switch 31 where the switch rails do not more, whereby lubrication of these portions is not needed. The device 1 can thereby lubricate more switch rails 31 before it has to be refilled.

Figure 3A:
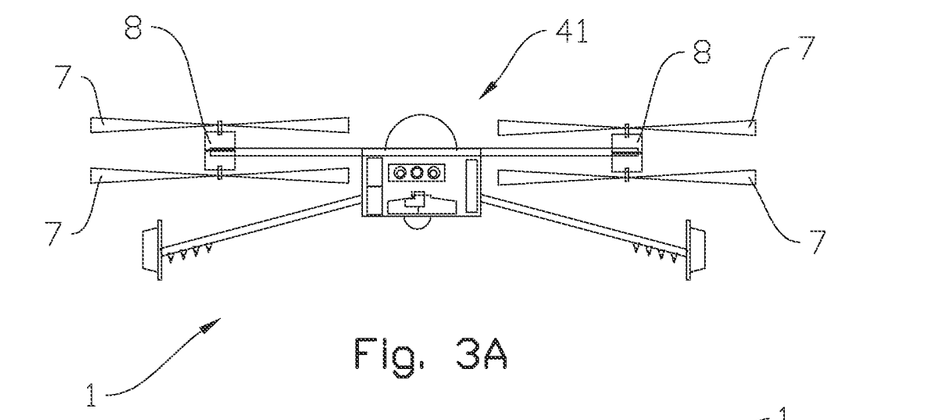
FIG. 3 shows the device from FIGS. 1 and 2 viewed from the front and from above, respectively, whereon a separate vessel is attached.
Figure 3B:
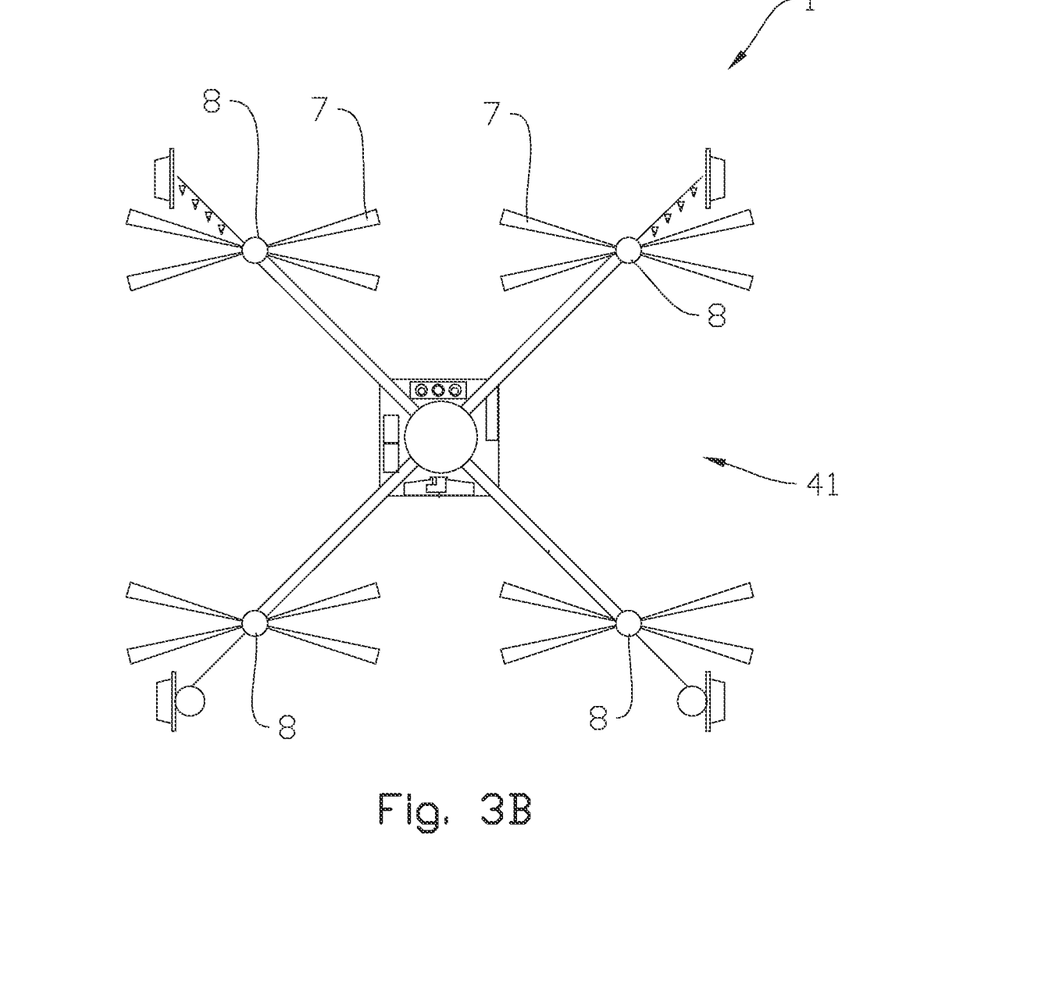

FIGS. 3A and B shows the device 1 from FIGS. 1 and 2 viewed from the front and from above, respectively, whereon a separate vessel 41 comprising rotors 7 is attached. The rotors 7 are driven by motors 8. In this way the device 1 may be able to fly. The separate vessel 41 may for example be a commercially available vessel, whereby it may easily be replaced if it is damaged or malfunctions.

Figure 4A:
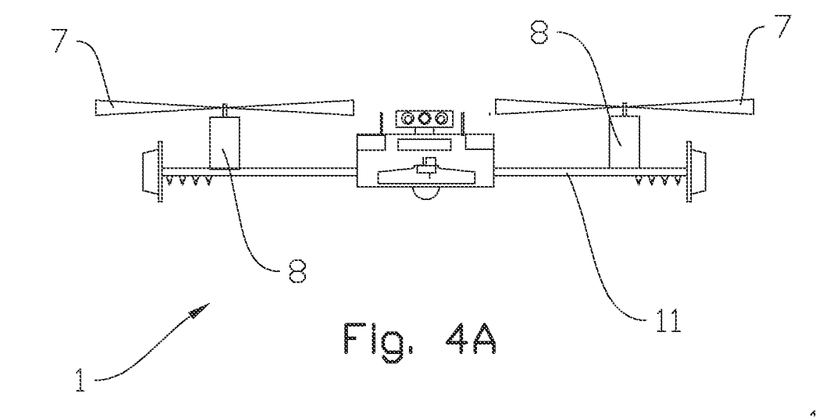
FIG. 4 shows another embodiment of the device according to the invention, wherein rotors are integrated into the device.
Figure 4B:
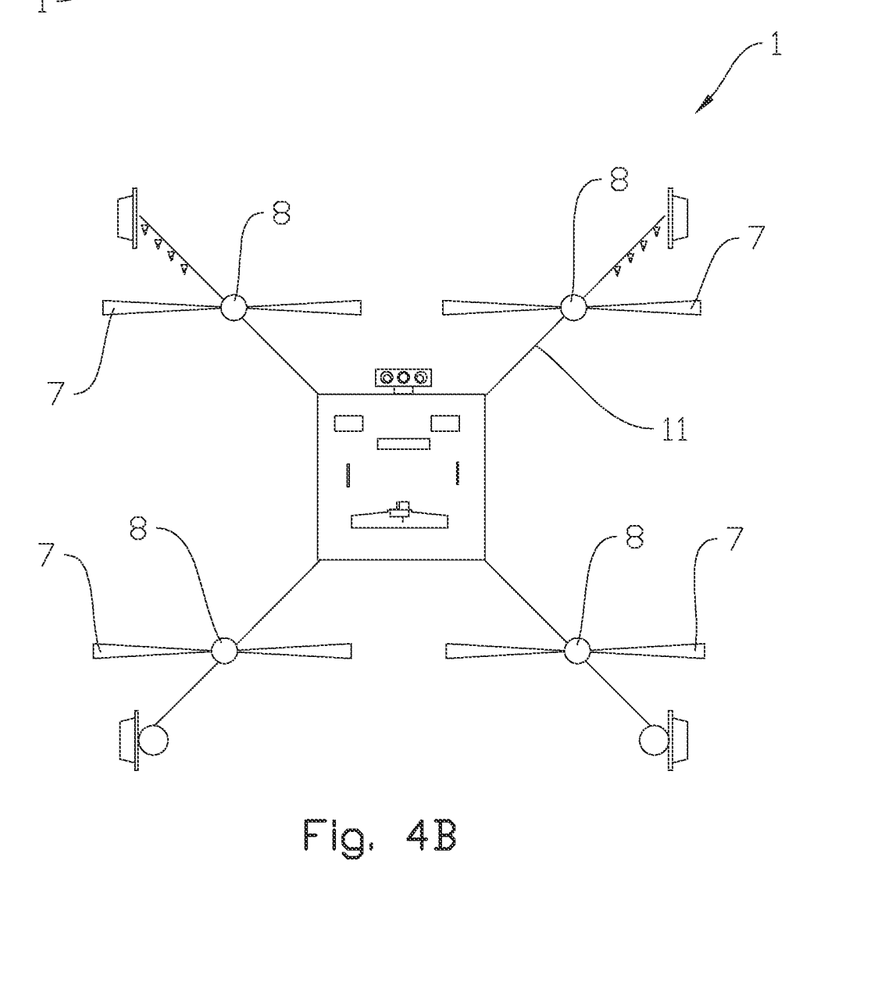

FIGS. 4A and B shows a device 1 similar to the device 1 shown in FIGS. 1-3, but where rotors 7 and corresponding motors 8 are integrated in the frame 11 of the device 1. This integration has the advantage that the device 1 shown in FIG. 4 may be made lighter than the device 1 with an attached separate vessel 41 as shown in FIG. 3. Especially when flying, the weight of the device 1 is important in order to use a little energy as possible.

Figure 5:
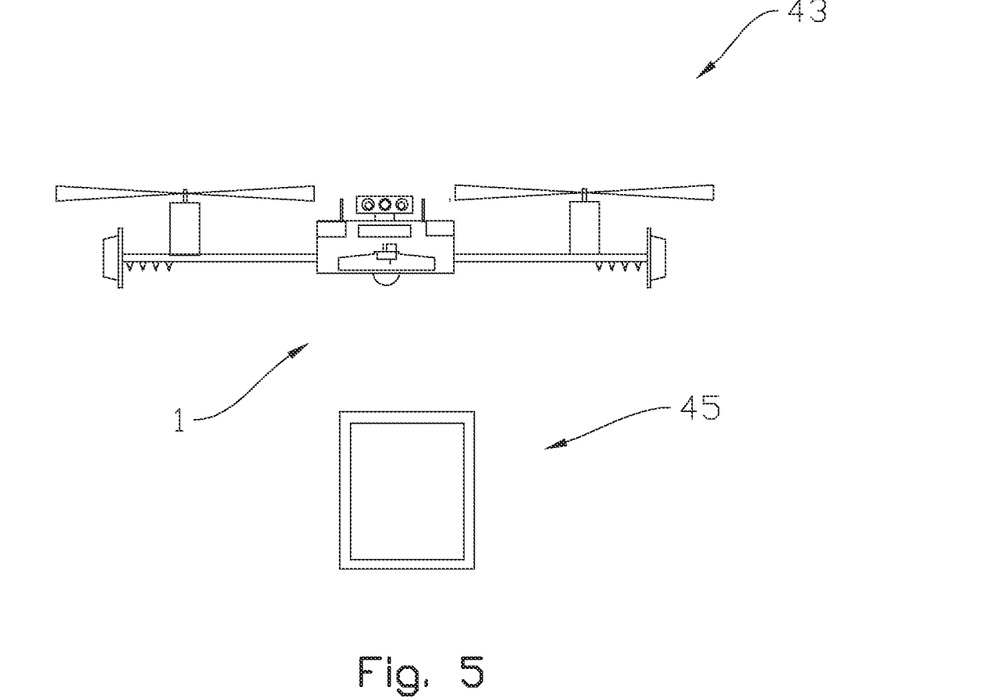
FIG. 5 shows a system according to the invention, wherein the system comprises the device from FIG. 4 and a controller for remotely controlling said device.

FIG. 5 shows a system 43 according to the invention, wherein the system 43 comprises the device 1 from FIG. 4 and a controller 45 for remotely controlling said device 1. The controller 45 may for example be used to steer the device 1 directly in real time, to view live recordings from the camera unit 15 of the device 1, and/or to program the device 1 to do a specific task. The controller 45 may be a dedicated controller for a specific device, or it may be a computer program which can be installed on e.g. a computer, a tablet, or a cell phone.

Figure 6:
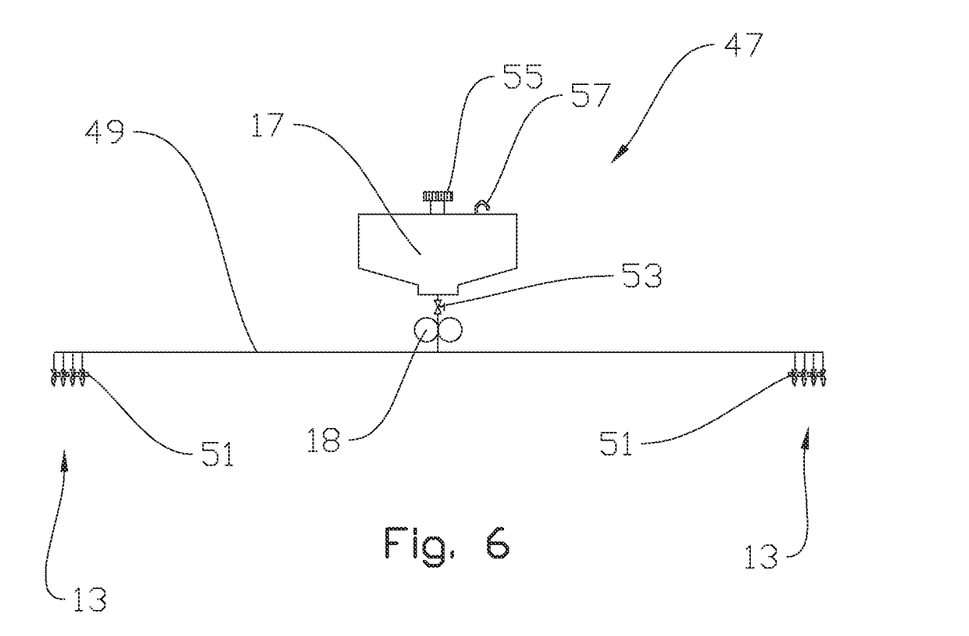
FIG. 6 shows a lubrication system which can be used on a device according to the invention.

FIG. 6 shows a lubrication system 47 which may be used on a device 1 according to the invention. The lubrication system 47 comprises a container 17 for lubricant, a plurality of nozzles 13 each having a valve 51 which may be controlled independently from each other, and a pump 18 for pumping lubricant from the container 17 to the nozzles 13 via a suitable tubing 49. The pump 18 may have different pump rates depending on the number of open nozzles 13. An air valve 57 allows air to enter the container 17 as lubricant is pumped out. The system also comprises a main valve 53 between the container 17 and the pump 18, whereby the fluid connection between said container 17 and pump 18 may be blocked. This may be beneficial, for example when cleaning the pump 18. A screw cap 55 closes an opening in the container 17. The screw cap 55 may be screwed off before refilling lubricant on the container 17. The container 17 may for example be able to contain a volume of 10 litre of lubricant.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps which are not stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A device for lubricating a railway switch, the device being remotely controllable and configured for moving on a railway track,
   wherein the device comprises a container for lubricant and at least one nozzle configured for lubricating the railway switch with the lubricant,
   wherein the at least one nozzle is further configured for providing a variable lubrication width.

2. The device according to claim 1, wherein the device comprises a plurality of nozzles and a control system controlling each nozzle independently from the others, and wherein each nozzle is positioned to lubricate a different portion of the railway switch.

3. The device according to claim 1, wherein the device further comprises rotors which allow the device to fly.

4. The device according to claim 1, wherein the device is configured to be attachable to a separate vessel which comprises rotors.

5. The device according to claim 1, wherein the device comprises a lidar system for correctly positioning of the device relative to the railway track.

6. The device according to claim 1, wherein the device comprises a stereo camera for detection of the railway switch.

7. The device according to claim 1, wherein the device further comprises an AI unit for processing data.

8. The device according to claim 1, wherein the device further comprises at least one strong and flexible string connecting different portions of the device.

9. The device according to claim 1, wherein the at least one nozzle comprises a broad nozzle with a variable opening.

10. The device according to claim 1, wherein the at least one nozzle is movable such as to be able to distribute lubricant over width in a transverse direction of a rail of the railway track.

11. A system comprising a device for lubricating a railway switch, the device being remotely controllable and configured for moving on a railway track,
   wherein the device comprises a container for lubricant and at least one nozzle configured for lubricating the railway switch with the lubricant,
   wherein the at least one nozzle is further configured for providing a variable lubrication width and a controller for remotely controlling said device.

12. A method for lubricating a railway switch, wherein the method comprises the steps of:
   remotely directing a device for lubricating the railway switch, the device being remotely controllable and configured for moving on a railway track, wherein the device comprises a container for lubricant and at least one nozzle configured for lubricating the railway switch with the lubricant, wherein the at least one nozzle is further configured for providing a variable lubrication width to the railway switch;
   remotely instructing the device to lubricate the railway switch; and
   remotely directing the device away from the railway switch to avoid hindering train traffic through said railway switch.

13. The device according to claim 2, wherein the device further comprises rotors which allow the device to fly.

14. The device according to claim 2, wherein the device is configured to be attachable to a separate vessel which comprises rotors.

\* \* \* \* \*